Oct. 29, 1957     A. I. ISAACSON     2,811,072
EDUCATIONAL PIANO
Filed Dec. 31, 1953
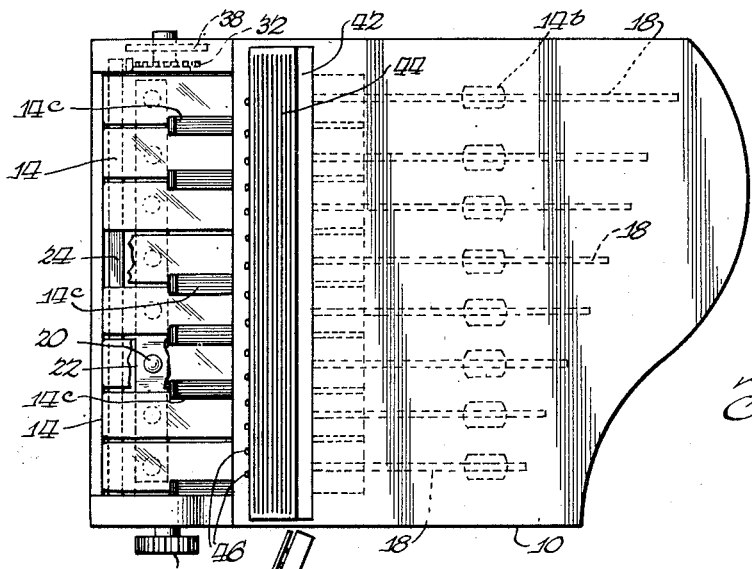
Fig. 1
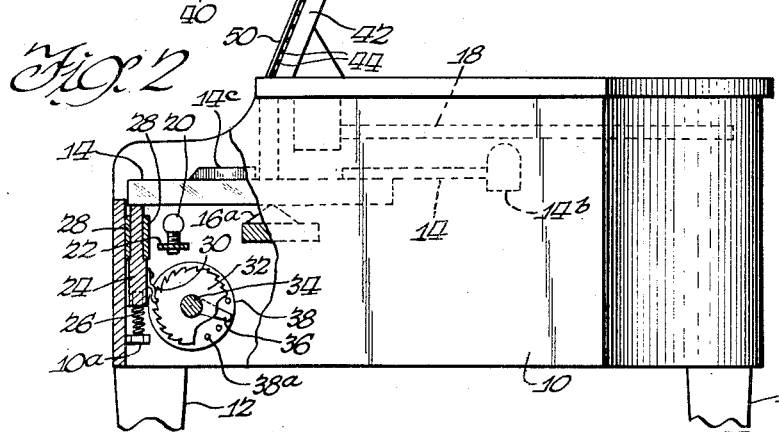
Fig. 2
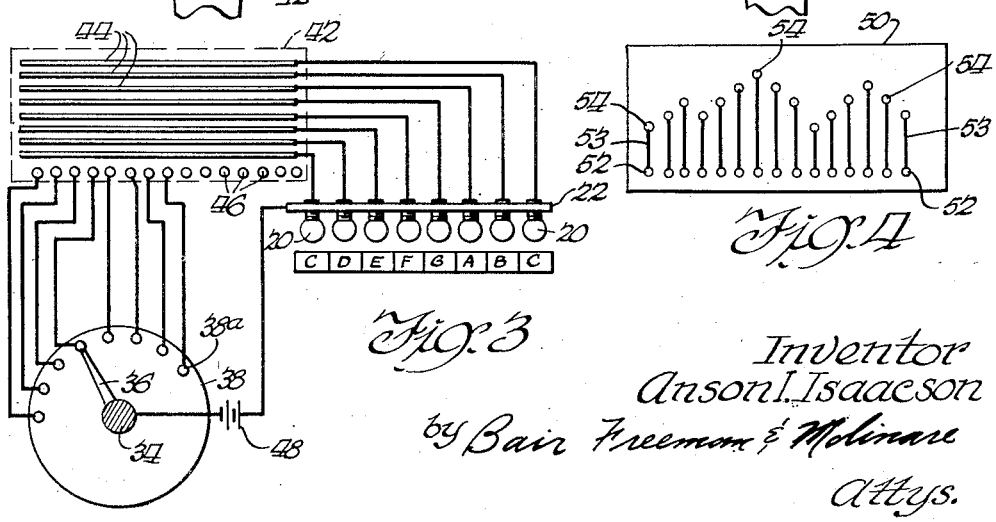
Fig. 3
Fig. 4
Inventor
Anson I. Isaacson
by Bair Freeman & Molinare
Attys.

United States Patent Office 2,811,072
Patented Oct. 29, 1957

2,811,072

EDUCATIONAL PIANO

Anson I. Isaacson, Elgin, Ill.

Application December 31, 1953, Serial No. 401,543

10 Claims. (Cl. 84—477)

This invention relates to an educational piano wherein the striking of each successive key actuates mechanism to indicate the key next to be struck.

One of the impediments to the playing of a piano, or toy piano, by a child lies in the inability of the child to determine the notes which should be successively struck. As a consequence of this difficulty children frequently lose all interest in a piano, or toy piano, before they have reached the point where they can read notes or effectively play by ear.

The educational piano construction of the present invention overcomes this difficulty and makes it possible for a child unable to read music or to play by ear to play tunes on the piano or toy piano. Briefly, in the structure here described, a terminal board is provided which is preferably located where the music rack of the piano is normally located. This board has contact elements adapted to receive the conductors of a music card placed thereon. The music card conductors correspond respectively to the successive notes. Ratchet mechanism is connected to the keys to be advanced one step each time a key is struck and includes a commutator operable to establish connection with the conductor corresponding to the successive notes on the card. Lamps are located beneath the piano keys respectively and connected to contact elements on the terminal board. As each successive key is struck the mechanism illuminates the key next to be struck. The sequence of notes is determined by the conductors on the music card, which, of course, are arranged in accord with the musical selection desired to be played.

It is therefore a general object of the present invention to provide an improved educational piano in which the striking of each successive key causes an indication of the key next to be struck.

Further it is an object of the present invention to provide an educational piano of the afore-mentioned type adapted to receive replaceable music cards so that the piano may be arranged to indicate the notes for many desired selections.

Additionally it is an object of the present invention to provide an educational piano of the afore-mentioned type wherein the keys to be successively struck are illuminated.

Further it is an object of the present invention to provide an improved educational piano that is simple, inexpensive, and reliable in construction and can be readily adapted to pianos of all sizes and types.

The novel features which I believe to be characteristic of my invention are set forth with particularity in the appended claims. My invention itself, however, both as to its organization and method of operation, together with further objects and advantages thereof, will best be understood by reference to the following description, taken in connection with the accompanying drawings, in which:

Figure 1 is a top plan view of an educational piano constructed in accordance with the present invention;

Figure 2 is a side elevational view with parts broken away of the piano of Figure 1 and with a music card in place;

Figure 3 is an electrical circuit diagram of the piano of Figures 1 and 2; and,

Figure 4 is a view of one music card for use on the piano of Figures 1 and 2.

Referring now to Figures 1 and 2, there is shown a toy piano consisting of a housing 10 supported by legs 12 and having a series of conventional piano keys 14. In the particular piano shown, the keys 14 are eight in number and correspond to the successive notes of the musical scale. The keys 14c, corresponding to the half notes, are dummies in the specific toy piano shown.

The keys 14 are connected to mechanism within the housing 10 to cause the notes to be struck as the keys are depressed. This may be accomplished by any of the mechanisms for this purpose well known in the art. In the particular structure shown, the keys are pivotally mounted upon the knife edge 16, Figure 2, and have striker arms 14a extending rearwardly. Each of these arms terminates in a striker head 14b which is attached to strike the taut string 18 located immediately above the striker head 14b as shown by the dotted lines of Figure 1, a separate string is provided for each key and located to be struck by the striker head of that key. Thus, as each key 14 is struck, the downward movement of the exposed portion of the key gives rise to upward movement of the striker head 14b to strike the string and cause the vibrations which give rise to the musical sound. As stated above, other piano mechanism, either a toy mechanism or a full size piano mechanism may be used.

A series of lights 20 are threadedly received in a fixed conducting cross arm 22 located beneath the keys. Each light lies beneath one of the keys as shown. The keys are constructed of a transparent or translucent material so that when the light is energized the corresponding key is illuminated and thus identified. A striker bar 24 extends beneath the keys 14 and is biased upwardly against the bottom faces of the keys by the springs 26 which seat at their bottom ends against the ears 10a formed on housing 10 and at their top ends seat in cavities in the bar 24. The bar 24 is held for up and down movements by the guide pieces 28, Figure 2, which extend the full length of the bar and also form stops to limit the downward movement of the respective keys. Thus as a key is struck, the striker bar 24 is depressed because of the seating engagement of the bar against the under surface of the keys. Suitable guide means (not shown) is provided to assure that the striker bar 24 does not tilt when the end keys are depressed but rather executes downward shifting motion only.

At one end, the striker bar 24 carries a pawl 30 which, as shown consists of a spring catch which bears against the face of the ratchet wheel 32. When the bar 24 is depressed, therefore, the pawl 30 seats against a tooth on the wheel 32 and thus rotates that wheel one step. When the key pressure is released, the striker bar 24 lifts under the bias of springs 26 and the pawl 30 rides up the tooth of ratchet 32 and snaps over the next tooth.

The ratchet wheel 32 is mounted on shaft 34 which also carries the conducting arm 36 of a commutator unit. Arm 36 rides over the circumferentially spaced contact buttons 38a mounted on the insulating support plate 38 to establish a conducting path between the shaft 34 and the particular contact button 38a upon which the arm rests. Each time a key is struck, the ratchet wheel 32 rotates one step and the arm 36 advances from engagement with one contact button 38a to the next button.

A knob 40 is attached to the shaft 34 and protrudes from the right hand end of the housing 10. This knob permits the user to reset the shaft 34, and hence arm 36, to the proper starting position. Suitable indicating means (not shown) is provided to show when the knob 40, and shaft 34, are in the starting position.

A terminal board 42 is located on the piano in the position usually occupied by the music. As shown best in Figure 3, this board consists of a series of parallel horizontal conductor bars 44 which extend across its full width and are spaced vertically. The board also has a series of contact buttons 46 spaced in direction parallel to the orientation of the bars 44. It will be noted from Figure 3 that each of the contact buttons 46 is connected to one of the contact buttons 38a of the commutator and that each of the bars 44 is connected to one of the lamps 20. Moreover, the common terminal of the lamps, namely the bar 22 into which the lamps are threaded, is connected to the voltage source 48 and thence to shaft 34 and commutator arm 36.

The music card 50, which rests against the terminal board 42 as shown in Figure 2, consists of a sheet of non-conducting material which has a series of rivets or other conducting members 52 which extend through the card and, when the card is in position, seat on the contact buttons 46. Each of the rivets 52 is electrically connected on one side of the card to a similar rivet 54 which is positioned to seat on one or another of the bars 44 when the card is in position. The conductors 53 extending between each of the rivets 52 are all on the same side of the card so that the card may be placed against the board 42 with the conductors 53 in spaced relationship with the board 42 and with only the rivets 52 and 54 in seating, contacting, relationship with the board.

When the card 50 is in position, the conductors 53 establish a circuit between each of the buttons 46 and a selected one of the bars 44. Since the successive buttons 46 are energized through the commutator arm 36 as the keys are struck, the desired sequence of notes can be indicated by the appropriate placing of the rivets 54 on the music card so as to energize the light 20 beneath the note next to be struck to reproduce the tune desired.

In order to play a tune it is merely necessary to set the shaft 34 and arm 36 to starting position by rotating the knob 40 until the index mark thereon is aligned with the reference mark on the housing 10. The music card for the desired tune is then placed on board 42. The player need then only strike the notes as successively illuminated by lamps 20 to reproduce the tune. Since the arm 36 advances one step each time a key is struck, the sequence of notes corresponding to those of the music card is illuminated.

It will, of course, be understood that the music card 50 may be of various constructions. If the conductors 53 are insulated they can, if desired, be on the side of the card facing terminal board 42. In this case rivets 52 and 54 need not extend through the card. Also, if desired, the face of the card 50 which is seen by the player may have printed thereon the music notes corresponding to the positions of the rivets 54.

While I have shown and described a specific embodiment of the present invention, it will, of course, be understood that various modifications and alternative constructions may be made without departing from its true spirit and scope. I therefore intend to cover all modifications and alternative constructions coming within their true spirit and scope.

What I claim as new and desire to secure by Letters Patent of the United States is:

1. An educational musical instrument adapted to indicate notes to be played in succession in accord with the conformation of conductors on a music card comprising in combination: a mechanism having note sounding devices capable of sounding a series of musical notes and a series of keys operable to sound said musical notes respectively when struck; lights operable when energized to indicate the keys respectively; a terminal board having a series of parallel conductor bars corresponding and connected to the lights, respectively, the board further having a series of conducting buttons spaced in direction generally parallel to the bars, the board being adapted to receive said music card with the conductors thereof seating against the respective bars and buttons to define conducting paths between the buttons, respectively, and the various bars; a commutator having a series of contact elements corresponding to the buttons, respectively, and a movable contactor operable to engage the contact elements in sequence; a source of energy for the lights; means defining an electric circuit from the source through the commutator to the contact buttons, respectively; and from the bars through the lights, respectively, back to the source; and means to advance the movable contactor to a new button each time a key is struck.

2. An educational musical instrument adapted to indicate notes to be played in succession in accord with the conformation of conducting elements on a music card comprising in combination: a mechanism having note sounding devices capable of sounding a series of musical notes and a series of keys operable to sound said musical notes respectively when struck; lights operable when energized to indicate the keys respectively; a terminal board having a series of parallel conductor bars corresponding and connected to the lights, respectively, the board further having a series of conducting buttons spaced in direction generally parallel to the bars, the board being adapted to receive said music card with the conducting elements thereof seating against the respective bars and buttons to establish conducting paths between the buttons, respectively, and the various bars; a commutator having a series of contact elements disposed in a circle and corresponding to the buttons, respectively, and a rotatable contactor operable to engage the contact elements in sequence; a source of energy for the lights; means defining an electric circuit from the source through the commutator to the contact buttons, respectively, and from the bars through the lights, respectively, back to the source, and ratchet means to advance the rotatable contactor to contact a new button each time a key is struck.

3. An educational musical instrument adapted to indicate notes to be played in succession in accord with the conformation of conductors on a music card comprising in combination: a mechanism having note sounding devices capable of sounding a series of musical notes and a series of keys operable to sound said musical notes respectively when struck; lights positioned to illuminate the respective keys when energized; a terminal board positioned adjacent the keys and having a first series of conducting elements corresponding to and connected with the lights, respectively, and a second series of conducting elements, one of said last series of conducting elements being for each successive note to be struck, the board being adapted to receive said music card with the conductors thereof seating against the conducting elements of the second series, respectively, to connect the same to the conducting elements of the first series to establish conducting paths therebetween in accordance with a desired sequence of notes; and means operable upon striking successive notes to energize the successive conducting elements of the second series and illuminate the lights in accordance with the sequence of the conductors on the card.

4. An educational musical instrument comprising in combination: a mechanism having note sounding devices capable of sounding a series of musical notes and a series of keys operable to sound said musical notes respectively when struck; a striker bar disposed beneath the keys to be depressed when any one is struck; a pawl and ratchet mechanism having its pawl portion operatively associated with the striker bar to advance the ratchet one step each time a key is struck; a commutator having a movable conducting arm and a series of fixed contact buttons, the contact buttons being adapted to be engaged successively by the movable arm, the movable arm being operatively associated with the ratchet to advance from one fixed contact button to the next each time a key is struck; electrical indicating means mounted to indicate the respective keys; and means operable to energize the indicating means respectively and in accordance with a predetermined sequence of notes as the commutator advances step-by-step.

5. An educational musical instrument adapted to indicate notes to be played in succession in accord with the conformation of conductors on a music card comprising in combination: a mechanism having note sounding devices capable of sounding a series of musical notes and a series of non-opaque keys operable to sound said musical notes respectively when struck; lights disposed below the keys respectively to illuminate the same when energized; a terminal board having a series of parallel conductor bars corresponding and connected to the lights, respectively, the board further having a series of conducting buttons spaced in direction generally parallel to the bars, the board being adapted to receive said music card with the conductors thereof seating against the respective buttons to establish conducting paths between the buttons, respectively, and the various bars; a commutator having a series of contact elements connected to the buttons, respectively, and a movable contactor operable to engage the contact elements in sequence; a source of energy for the lights; means defining an electric circuit from the source through the commutator to the contact buttons, respectively, and from the bars through the lights, respectively, to the source; and means to advance the movable contactor one step to establish contact with a new button each time a key is struck.

6. An educational musical instrument adapted to indicate notes to be played in succession in accord with the conformation of conductors on a music card comprising in combination: a mechanism having note sounding devices capable of sounding a series of musical notes and a series of non-opaque keys operable to sound said musimal notes respectively when struck; lights disposed below the keys respectively to illuminate the same when energized; a terminal board located above the keys for view by the player having a series of parallel conductor bars corresponding and connected to the light, respectively, the board further having a series of conducting buttons spaced in direction generally parallel to the bars, the board being adapted to receive said music card with the conductors thereof seating against the respective buttons to establish conducting paths between the buttons, respectively, and the various bars; a commutator having a series of contact elements connected to the buttons, respectively, and a movable contactor operable to engage the contact elements in sequence; a source of energy for the lights; means defining an electric circuit from the source through the commutator to the contact buttons, respectively, and from the bars through the lights, respectively, to the source; and means to advance the movable contactor one step to establish contact with a new button each time a key is struck.

7. An educational musical instrument adapted to indicate notes to be played in succession in accord with the conformation of conductors on a music card comprising in combination: mechanism having note sounding devices capable of sounding a series of musical notes and a series of keys operable to sound said musical notes respectively when struck; electrical indicating means corresponding to each of the keys respectively and operable when energized to indicate the corresponding key; a terminal board having a first series of conducting elements corresponding to and connected with the indicating means respectively, and a second series of conducting elements, one of said last series of conducting elements being for each successive note to be struck, the board being adapted to receive said music card with the conductors thereof seating against the conducting elements of the second series, respectively, to connect the same to the conducting elements of the first series to establish conducting paths therebetween in accordance with a desired sequence of notes; and means operable upon striking successive notes to energize the successive conducting elements of the second series and energize the indicating means in accordance with the sequence of the conductors on the card.

8. In combination: mechanism having note sounding devices capable of sounding a series of musical notes and a series of keys operable to sound said musical notes respectively when struck; electrical indicating means corresponding to each of the keys respectively and operable when energized to indicate the corresponding key; a terminal board having a first series of conducting elements corresponding to and connected with the indicating means respectively, and a second series of conducting elements, one of said last series of conducting elements being for each successive note to be struck, the board being adapted to receive a music card; a music card received on said board and having conductors seating against the conducting elements of the second series, respectively, and the conducting elements of the first series, respectively, and defining conducting paths between the conductors of the first series and the conductors of the second series in accordance with a desired sequence of notes; and means operable upon striking successive notes to energize the successive conducting elements of the second series and thereby energize the indicating means in accordance with the sequence of the conductors on the card.

9. An educational musical instrument adapted to indicate notes to be played in succession in accord with the conformation of conductors on a music card comprising in combination: a mechanism having note sounding devices capable of sounding a series of musical notes and a series of non-opaque keys operable to sound said musical notes respectively when struck; lights disposed below the keys respectively to illuminate the same when energized; a terminal board located above the keys for view by the player having a first series of conducting elements corresponding to and connected with the lights, respectively, and a second series of conducting elements, one of said last series of conducting elements being for each successive note to be struck, the board being adapted to receive said music card with the conductors thereof seating against the conducting elements of the second series, respectively, to connect the same to the conducting elements of the first series to establish conducting paths therebetween in accordance with a desired sequence of notes; and means operable upon striking successive notes to energize the successive conducting elements of the second series and illuminate the lights in accordance with the sequence of the conductors on the card.

10. An educational musical instrument adapted to indicate notes to be placed in succession in accord with the conformation of conductors on a music card comprising in combination: a mechanism having note sounding devices capable of sounding a series of musical notes and a series of keys operable to sound said musical notes respectively when struck; electrical indicating means corresponding to each of the keys respectively and operable when energized to indicate the corresponding key: a terminal board having a first series of conducting elements corresponding to and connected with the indicating means respectively, and a second series of conducting elements, one of said last series of conducting elements being for each successive note to be struck, the board being adapted to receive said music card with the conductors thereof seating against the conducting elements of the second series, respectively, to connect the same to the conducting elements of the first series to establish conducting paths therebetween in accordance with a desired sequence of notes; a commutator having a series of contact elements connected to the conducting elements of said second series, respectively, and a movable contactor operable to engage the contact elements in sequence; a source of energy for said indicating means; means defining an electric circuit from the source through the commutator to the conducting elements of said second series, respectively, from the conducting elements of said first series to the indicating means, respectively, and from the indicating means back to the source; and means to advance the movable contactor one step to establish contact with a new element each time a key is struck.

References Cited in the file of this patent

UNITED STATES PATENTS

| | | |
|---|---|---|
| 1,607,226 | Wood | Nov. 16, 1926 |
| 2,675,731 | Ruben | Apr. 20, 1954 |

FOREIGN PATENTS

| | | |
|---|---|---|
| 442,572 | France | June 22, 1912 |
| 374,189 | Great Britain | June 9, 1932 |